United States Patent [19]
Matsuda

[11] Patent Number: 5,774,616
[45] Date of Patent: Jun. 30, 1998

[54] SEMICONDUCTOR LASER MODULE AND METHOD FOR FABRICATING THE SAME

[75] Inventor: Kenichi Matsuda, Moriguchi, Japan

[73] Assignee: Matsushita Electrical Industrial Co., Ltd., Osaka, Japan

[21] Appl. No.: 669,952

[22] Filed: Jun. 25, 1996

[30]  Foreign Application Priority Data

Jun. 27, 1995 [JP] Japan .................................. 7-160404

[51] Int. Cl.$^6$ ...................................................... G02B 6/36
[52] U.S. Cl. .................................. 385/89; 385/94; 385/92
[58] Field of Search ........................................ 385/88–94

[56]  References Cited

U.S. PATENT DOCUMENTS

| | | | |
|---|---|---|---|
| 4,326,771 | 4/1982 | Henry et al. ............................... | 385/92 |
| 4,826,272 | 5/1989 | Pimpinella et al. ....................... | 385/92 |
| 5,416,872 | 5/1995 | Sizer, II et al. ............................ | 385/92 |
| 5,434,939 | 7/1995 | Matsuda .................................... | 385/92 |
| 5,586,207 | 12/1996 | Goodwin .................................. | 385/92 |

FOREIGN PATENT DOCUMENTS 6-237016  8/1994  Japan .

OTHER PUBLICATIONS

K. Tai et al., "Selfaligned Fibre Pigtailed Surface Emitting Lasers on Si Submounts", *Electronics Letters*, vol. 27, No. 22, pp. 2030–2032 (1991).

*Primary Examiner*—John Ngo
*Attorney, Agent, or Firm*—Ratner & Prestia

[57]  ABSTRACT

A semiconductor laser module includes: a semiconductor substrate; a plurality of surface emitting lasers provided on a primary plane of the semiconductor substrate; a plurality of guiding holes provided on a secondary plane of the semiconductor substrate, the secondary plane being opposite to the primary plane; and an optical fiber tape including a plurality of optical fibers and a covering material which fixes the plurality of optical fibers in parallel with each other, one tip of the optical fiber tape being adjoined to the secondary plane of the semiconductor substrate. A pitch of the respective surface emitting lasers is equal to an interval of a center of the respective optical fibers. The respective guiding holes are aligned with the respective surface emitting lasers so that a center of a light beam emitted from each of the surface emitting lasers and a center of each of the guiding holes are at approximately the same position on the secondary plane of the semiconductor substrate. A diameter of each of the guiding holes is substantially equal to an outer diameter of each of the optical fibers. And a portion of the respective optical fibers at tips thereof is exposed from the covering material and inserted into the respective guiding holes.

26 Claims, 8 Drawing Sheets

SEMICONDUCTOR LASER MODULE AND METHOD FOR FABRICATING THE SAME

BACKGROUND OF THE INVENTION

1. Field of the Invention

The present invention relates to a semiconductor laser module including a vertical cavity surface emitting laser which is optically coupled to an optical fiber tape, and a method for fabricating the same.

2. Description of the Related Art

At present, edge emitting semiconductor lasers are generally and widely used as semiconductor laser modules including optical fibers. Since an edge emitting semiconductor laser has a wide radiation angle, a lens should be inserted between the laser and an optical fiber to obtain high efficiency in optical coupling. Precise optical alignment is required for the semiconductor laser, the lens and the optical fiber in assembling a module.

The alignment is usually achieved as follows: The laser is operated to emit a laser beam. Then, the optical fiber is fixed at the point where output optical power from the far end of the optical fiber is at maximum. This method results in low throughput since a driving current has to be applied to the laser during the assembly. Moreover, relatively long working time is required for alignment even if an automated optical-axis aligner is used. These factors limit the cost reduction of semiconductor laser modules.

In order to avoid the above problems, a method for aligning optical axes based on mechanical positioning, in which an optical fiber is aligned with a substrate having a V-shaped groove, has been proposed. However, alignment between a semiconductor laser chip and a substrate having a V-shaped groove takes much time and cost to be sufficiently precise.

On the other hand, it has been proposed to apply vertical cavity surface emitting lasers, which have recently seen rapid improvements in performance, to semiconductor laser modules with optical fibers. Since the surface emitting lasers have narrow radiation angles, high efficiency can be expected even for direct optical coupling without lenses.

Figure 7:
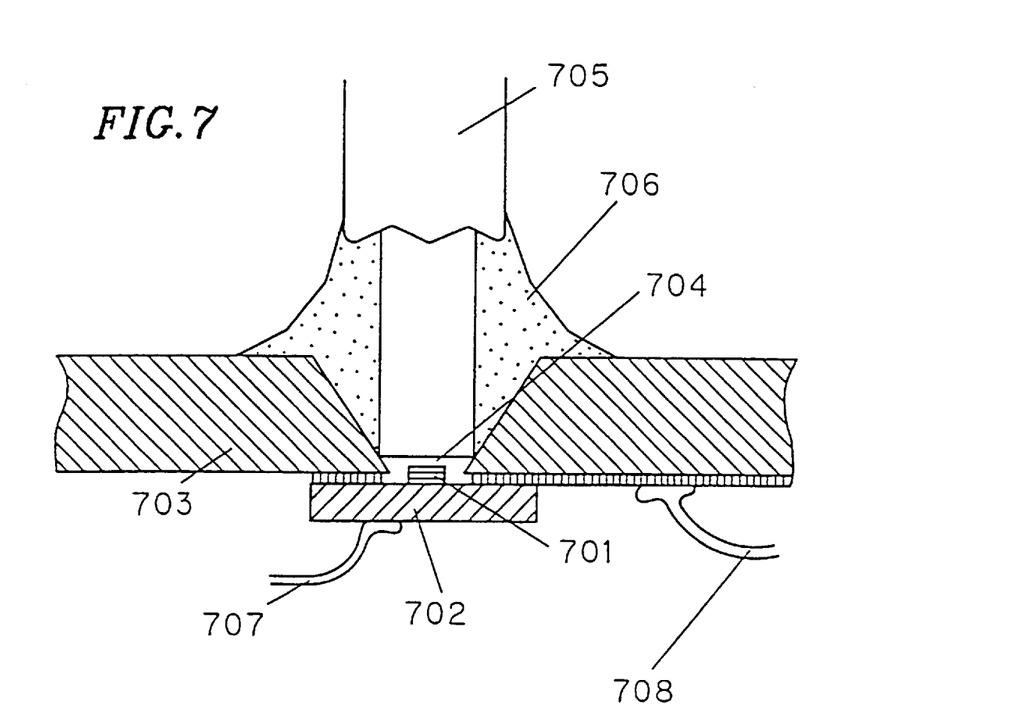
FIG. 7 is a cross-sectional view showing a conventional semiconductor laser module.

The direct coupling of a surface emitting laser and an optical fiber is described, for example, in K. Tai et al., "Selfaligned fiber pigtailed surface emitting lasers on Si submounts", Electronics Letters, Vol.27, No.22, pp. 2030–2032 (1991). The configuration disclosed therein is shown in FIG. 7.

In this example, optical axes are self-aligned utilizing a feature of surface emitting lasers, that is, a laser beam is perpendicularly emitted onto a surface of a substrate. As shown in FIG. 7, a vertical cavity surface emitting laser 701 is provided on a light-emitting chip 702. The light-emitting chip 702 is attached to a Si submount 703. The Si submount 703 has a guiding hole 704 in which an optical fiber 705 is inserted and fixed, whereby the optical fiber 705 is optically coupled to the vertical cavity surface emitting laser 701.

The steps for aligning the vertical cavity surface emitting laser 701 and the optical fiber 705 are as follows. First, indium (In) bumps aligned to the guiding hole 704 are formed on the Si submount 703. Then, other In bumps aligned to the surface emitting laser 701 are formed on the light-emitting chip 702. When the In bumps on the light-emitting chip 702 and the In bumps on the Si submount 703 are bonded to each other, the surface emitting laser 701 and the guiding hole 704 are self-aligned with each other by the tension between the In bumps. Then, the optical fiber 705 is inserted into the guiding hole 704 and fixed with a UV cured resin 706, which results in the final alignment between the optical axes of the surface emitting laser 701 and the optical fiber 705. The surface emitting laser 701 is electrically connected to an external circuit with an n-side wire 707 bonded to the light emitting chip 702 and with a p-side wire 708 bonded to the submount 703.

By using this method, a coupling efficiency of approximately 100% is attained for a multimode optical fiber. The method described above is advantageous in that high coupling efficiency can be obtained without driving the laser during assembly. With this method, however, it is difficult to attach the submount 703 to a package since the light-emitting chip 702 is mounted on one side of the submount 703 while the optical fiber 705 is fixed thereto from the other side.

Another optical fiber module having improved facility in attaching the submount to the package is described in Japanese Laid-Open Patent Publication No. 6-237016 which corresponds to U.S. Pat. No. 5,434,939. The configuration disclosed therein is shown in FIG. 8.

Figure 8:
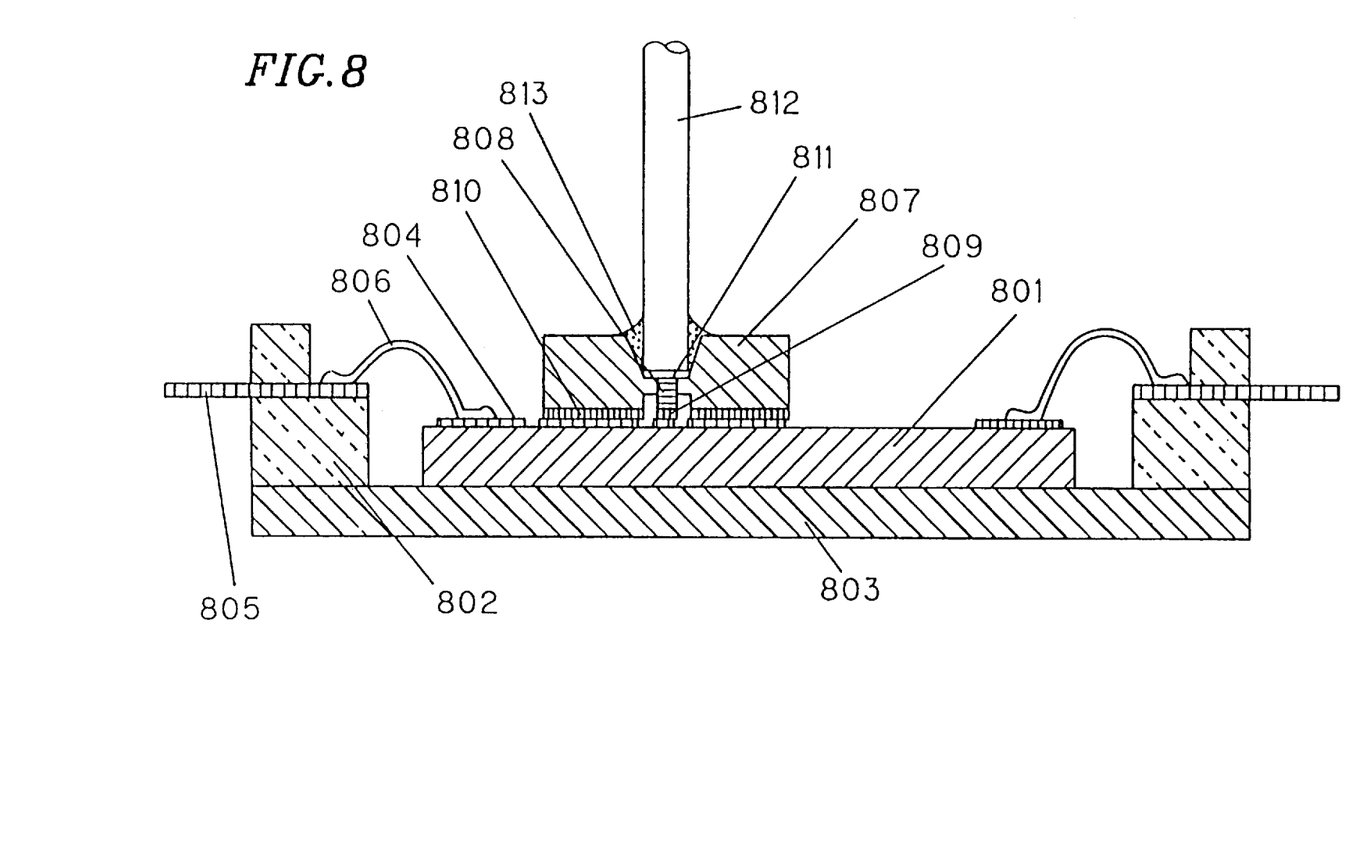
FIG. 8 is a cross-sectional view showing another conventional semiconductor laser module.

In the optical fiber module as shown in FIG. 8, an electronic circuit board 801 serving as a Si or GaAs IC chip is die-bonded to a floor 803 of a package 802. Pads 804 on the electronic circuit board 801 are connected to leads 805 of the package 802 with wires 806. A vertical cavity surface emitting laser 808 is formed on a primary plane of a light-emitting chip 807. The light-emitting chip 807 is bonded to the electronic circuit board 801 so that the primary plane of the light-emitting chip 807 is in contact with a partial region of the electronic circuit board 801. An anode 809 and a cathode 810 of the surface emitting laser 808 have electrical contacts connected independently to pads on the electronic circuit board 801. A guiding hole 811 is formed on a plane opposite to the primary plane of the light emitting chip 807. An optical fiber 812 is inserted into the guiding hole 811, and fixed with an adhesive 813 such as a UV cured resin.

According to the above-described configuration of the optical fiber module, the light-emitting chip 807 is mounted on one side of the electronic circuit board 801 and the optical fiber 812 is then fixed thereto from the same side, the optical fiber module can be easily fixed onto the package 802.

According to the above conventional technique disclosed in Japanese Laid-Open Patent Publication No. 6-237016 (U.S. Pat. No. 5,434,939) relating to a semiconductor laser module including a surface emitting laser optically coupled to an optical fiber, only one optical fiber is connected to a surface light emitting laser. On the other hand, parallel optical interconnection using a plurality of optical fibers has recently attracted attention. Thus, a method for connecting a plurality of optical fibers to a surface emitting laser array is desired.

The above publication describes that the technique can be easily implemented even in the case where a plurality of surface emitting lasers are formed on a light-emitting chip. In actuality, however, it is not easy to couple a plurality of optical fibers to a plurality of surface emitting lasers. Even in the case where a plurality of optical fibers are intended to be coupled to a plurality of surface emitting lasers by inserting the optical fibers into guide holes, it is necessary to align each optical fiber with the respective light-emitting chip so as to insert the optical fibers into the guiding holes. Moreover, when the optical fibers are successively inserted into the guiding holes, a previously inserted optical fiber interferes with the alignment of a next optical fiber to be inserted.

Also in the case where an optical fiber tape including a plurality of optical fibers fixed in parallel by a covering material is used, there arises the same problem as that described above. This is because the optical fibers of the optical fiber tape are arranged in a one-dimensional array while the surface emitting lasers to be coupled to the respective optical fibers are arranged in a two-dimensional array. More specifically, after one optical fiber tape has been coupled to one row of surface emitting lasers in the two-dimensional array, another optical fiber tape is required to be coupled to a next row. Therefore, the previously inserted optical fiber tape interferes with the alignment of the next optical tape with the row of the surface emitting lasers.

In addition, the conventional technique is also disadvantageous in that pitches between the optical fibers are not maintained when the covering material is removed from the optical fibers upon coupling. The optical fiber tape, which is now put into practical use, has a central distance between the optical fibers of about 250 $\mu$m. When the optical fibers are cut at a normal exposure length, i.e., about 10 mm, after the covering material is removed, the tips of the optical fibers often spontaneously cross each other.

In addition, sufficient mechanical strength in fixation of the surface emitting laser chip and the optical fiber cannot be obtained with the above conventional techniques. As is apparent from the aforementioned Japanese Laid-Open Patent Publication No. 6-237016 (U.S. Pat. No. 5,434,939) and the article of K. Tai et al., it is difficult to hold the optical fiber perpendicular to the surface of the laser chip solely by inserting a tip of the optical fiber into a shallow guiding hole and fixing it with a UV cured resin. When force is externally applied to the optical fiber, the optical fiber is easily inclined, and furthermore, there is high possibility that the tip of the optical fiber will come off the fixed part. Not only in the case where the fixed part comes off but also in the case where the optical fiber is greatly inclined, an optical coupling efficiency between the surface emitting laser and the optical fiber is greatly lowered.

SUMMARY OF THE INVENTION

According to one aspect of the invention, a semiconductor laser module is provided, which includes: a semiconductor substrate; a plurality of surface emitting lasers provided on a primary plane of the semiconductor substrate; a plurality of guiding holes provided on a secondary plane of the semiconductor substrate, the secondary plane being opposite to the primary plane; and an optical fiber tape including a plurality of optical fibers and a covering material which fixes the plurality of optical fibers in parallel with each other, one tip of the optical fiber tape being adjoined to the secondary plane of the semiconductor substrate. A pitch of the respective surface emitting lasers is equal to an interval of a center of the respective optical fibers. The respective guiding holes are aligned with the respective surface emitting lasers so that a center of a light beam emitted from each of the surface emitting lasers and a center of each of the guiding holes are at approximately the same position on the secondary plane of the semiconductor substrate. A diameter of each of the guiding holes is substantially equal to an outer diameter of each of the optical fibers. And a portion of the respective optical fibers at tips thereof is exposed from the covering material and inserted into the respective guiding holes.

According to another aspect of the present invention, a semiconductor laser module is provided, which includes: a supporting substrate; a semiconductor substrate, having a primary plane and a secondary plane opposite to the primary plane, provided on the supporting substrate in such a manner that the primary plane is in contact with the supporting substrate; a surface emitting laser provided on the primary plane of the semiconductor substrate; a guiding hole provided on the secondary plane of the semiconductor substrate; an optical fiber cable including an optical fiber and a covering material which covers the optical fiber, one tip of the optical fiber cable being adjoined to the secondary plane of the semiconductor substrate; and a fiber supporting member provided perpendicularly to the semiconductor substrate. The guiding hole is aligned with the surface emitting laser so that a center of a light beam emitted from the surface emitting laser and a center of the guiding hole are at approximately the same position on the secondary plane of the semiconductor substrate. A diameter of the guiding hole is substantially equal to an outer diameter of the optical fiber. A portion of the optical fiber at one tip thereof is exposed from the covering material and inserted into the guiding hole. And the covering material is supported by the fiber supporting member.

According to still another aspect of the present invention, a semiconductor laser module is provided, which includes: a supporting substrate; a semiconductor substrate, having a primary plane and a secondary plane opposite to the primary plane, provided on the supporting substrate in such a manner that the primary plane is in contact with the supporting substrate; a surface emitting laser provided on the primary plane of the semiconductor substrate; a guiding hole provided on the secondary plane of the semiconductor substrate; an optical fiber cable including an optical fiber and a covering material which covers the optical fiber, one tip of the optical fiber cable being adjoined to the secondary plane of the semiconductor substrate; and a resin molding which integrally seals the semiconductor substrate, the supporting substrate, and a portion of the optical fiber cable located in the vicinity of the adjoined tip thereof. The guiding hole is aligned with the surface emitting laser so that a center of a light beam emitted from the surface emitting laser and a center of the guiding hole are at approximately the same position on the secondary plane of the semiconductor substrate. A diameter of the guiding hole is substantially equal to an outer diameter of the optical fiber. And a portion of the optical fiber at one tip thereof is exposed from the covering material and inserted into the guiding hole.

According to still another aspect of the present invention, a method for fabricating a semiconductor laser module is provided. The method includes the steps of: providing a plurality of surface emitting lasers which are arranged in a two-dimensional array on a primary plane of a semiconductor substrate; forming a plurality of guiding holes arranged in a two-dimensional array on a secondary plane of the semiconductor substrate in such a manner that the respective guiding holes are aligned with the respective surface emitting lasers; fixing the semiconductor substrate on a supporting substrate in such a manner that the primary plane of the semiconductor substrate is in contact with the supporting substrate; providing a first optical fiber tape including a plurality of first optical fibers and a first covering material which fixes the first optical fibers in parallel with each other, and exposing a portion of the first optical fibers at tips thereof from the first covering material; aligning the respective first optical fibers with the respective guiding holes in a first row so that the respective first optical fibers are inserted into the respective guiding holes in the first row, thereby adjoining the first optical fiber tape to the secondary plane of the semiconductor substrate; fixing the first covering material of the first optical fiber tape to a fiber supporting member; providing a second optical fiber tape including a plurality of second optical fibers and a second covering material which fixes the second optical fibers in parallel with each other, and exposing a portion of the second optical fibers at tips thereof from the second covering material; aligning the respective second optical fibers with the respective guiding holes in a second row so that the respective second optical fibers are inserted into the respective guiding holes in the second row, thereby adjoining the second optical fiber tape to the secondary plane of the semiconductor substrate; and fixing the second covering material of the second optical fiber tape to the first covering material of the first optical fiber tape.

According to still another aspect of the present invention, a method for fabricating a semiconductor laser module is provided. The method includes the steps of: providing a plurality of surface emitting Lasers which are arranged in a two-dimensional array on a primary plane of a semiconductor substrate; forming a plurality of guiding holes arranged in a two-dimensional array on a secondary plane of the semiconductor substrate in such a manner that the respective guiding holes are aligned with the respective surface emitting lasers; fixing the semiconductor substrate on a supporting substrate in such a manner that the primary plane of the semiconductor substrate is in contact with the supporting substrate; providing a first optical fiber tape including a plurality of first optical fibers and a first covering material which fixes the first optical fibers in parallel with each other, and exposing a portion of the first optical fibers at tips thereof from the first covering material; providing a second optical fiber tape including a plurality of second optical fibers and a second covering material which fixes the second optical fibers in parallel with each other, and exposing a portion of the second optical fibers at tips thereof from the second covering material; overlaying the second optical fiber tape onto the first optical fiber tape, thereby aligning the respective first optical fibers with the respective second optical fibers; fixing the first and second optical fiber tapes with each other; and aligning the respective first and second optical fibers with the respective guiding holes so that the respective first and second optical fibers are inserted into the respective guiding holes, thereby adjoining the first and second optical fiber tapes to the secondary plane of the semiconductor substrate.

Thus, the invention described herein makes possible the advantages of: (1) providing a semiconductor laser module including a plurality of optical fibers optically coupled to a plurality of surface emitting lasers based on mechanical alignment; and (2) providing a method for fabricating such a semiconductor laser module.

These and other advantages of the present invention will become apparent to those skilled in the art upon reading and understanding the following detailed description with reference to the accompanying FIGS.

BRIEF DESCRIPTION OF THE DRAWINGS

FIG. 3 is a cross-sectional view showing a semiconductor laser module according to Example 3 of the present on.

DESCRIPTION OF THE PREFERRED EMBODIMENTS

According to a first configuration of the present invention, a plurality of optical fibers are optically coupled with a plurality of surface emitting lasers at a time using an optical fiber tape. The optical fiber tape includes a plurality of optical fibers fixed in parallel by a covering material. A plurality of surface emitting lasers are formed on a primary plane of a semiconductor substrate, and a plurality of guiding holes are formed on a secondary plane (a plane opposite to the primary plane) of the semiconductor substrate. The pitches of the surface emitting lasers and the guiding holes are set so as to be equal to a center distance between the optical fibers included in the optical fiber tape. The guiding holes are aligned with the surface emitting lasers, respectively, so that a center of a light beam emitted from each of the surface emitting lasers and a center of each of the guiding holes are at approximately the same position on the secondary plane of the semiconductor substrate. A diameter of the guiding hole is set to be almost equal to an outer diameter of the optical fiber core wire.

In the above configuration, when the tip of the optical fiber tape is adjoined to the secondary plane of the semiconductor substrate so that the optical fibers exposed from a covering material are inserted into the respective guiding holes, the surface emitting lasers arranged in a one-dimensional array and the optical fiber tapes are optically coupled at a time. When the optical fibers are exposed from the covering material, there may arise a problem that the intervals between the optical fibers cannot be maintained. In order to overcome this problem, it is important to shorten a length of the optical fibers to be exposed from the covering material at the tip of the optical fiber tape. Specifically, it is desirable that an exposed length is about 3 mm or less.

According to second and third configurations in coupling of the optical fibers using guiding holes of the present invention, it is intended to enhance the strength of mechanical fixation between the semiconductor substrate, on which the surface emitting lasers are formed, and the optical fibers. Therefore, application of the configurations are not necessarily limited to the case where an optical fiber tape is used. The configurations are also applicable to the case where one optical fiber is coupled with a surface emitting laser as described in the aforementioned Japanese Laid-Open Patent Publication No. 6-237016 (U.S. Pat. No. 5,434,939).

According to the second configuration of the present invention, a fiber supporting member is used to enhance the fixation strength of the optical fibers. The fiber supporting member is held perpendicular to the semiconductor substrate on which the surface emitting lasers are formed. At the tips of the optical fiber cables, the optical fibers partially exposed from the covering material are inserted into the respective guiding holes. Thereafter, the covering material is fixed to the fiber supporting material at the rear of the inserted part of the optical fibers. Thus, while the tips of the optical fibers are aligned using the guiding holes, the fiber supporting member is not strictly aligned with the surface emitting lasers. If the fiber supporting member is misplaced, the optical fibers are not set perpendicularly to the semiconductor substrate any longer. However, by fixing the covering material to the fiber supporting member at the position far from the tips of the optical fibers, the degree of such inclination of the optical fibers can be reduced. As a result, an optical coupling efficiency is scarcely degraded.

According to the third configuration of the present invention, the semiconductor substrate on which surface emitting lasers are formed, a supporting substrate on which the semiconductor substrate is placed, and a portion of the optical fiber cables vicinal to the tip thereof are integrally sealed with a resin. Since the optical fibers are inserted into the respective guiding holes at the tips of the optical fiber cables, the optical fibers are aligned even when a resin is injected. However, under some resin injection conditions, the optical fibers are deflected, causing the tips thereof to misalign with the guiding holes. In order to avoid this, it is effective to apply the second configuration of the present invention into the third configuration. More specifically, after the covering material covering the optical fibers is fixed to the fiber supporting member, the components including the fiber supporting member are sealed with a resin.

In the above-mentioned first to third configurations, the surface emitting lasers and the guiding holes can be respectively arranged in two-dimensional arrays. Then, a plurality of layered optical fiber tapes can be adjoined to a secondary plane of the semiconductor substrate. In this case, when a first optical fiber tape has been coupled to the guiding holes in a first row of the two-dimensional array, and then a second optical fiber tape is to be coupled to the guiding holes in a second row, the first optical fiber tape interferes with the alignment of the second optical fiber tape. A first fabrication method and a second fabrication method of the present invention are achieved so as to avoid this problem.

According to the first fabrication method of the present invention, the fiber supporting member in the second configuration set forth above is utilized. At the tip of a first optical fiber tape, only a small part of a plurality of optical fibers is exposed from a first covering material so as to be inserted into guiding holes arranged in a first row. Thereafter, the first covering material is fixed to the fiber supporting member. When the first optical fibers are to be inserted, the first covering material is clipped with a holding tool attached to an optical stage so as to linearly hold the first optical fiber tape, thereby aligning the optical fibers with the respective guiding holes. The part which is clipped with the holding tool is positioned far from the fiber supporting member. After the first covering material is fixed to the fiber supporting member, the holding tool is detached. Then, the first optical fiber tape is curved.

Next, at the tip of a second optical fiber tape, only a small part of a plurality of second optical fibers is exposed from a second covering material so as to be inserted into guiding holes arranged in a second row. When the second optical fibers are to be inserted, the second covering material is clipped with the holding tool attached to the optical stage as in the case where the first optical fiber core wires are inserted. Since the first optical fiber tape is in a curved state, the first optical fiber tape does not interfere the alignment of the second optical fiber tape.

Finally, the second covering material is fixed to the first covering material, thereby completing the fixation of the first and second optical fiber tapes.

According to the second fabrication method of the present invention, a first optical fiber tape and a second optical fiber tape are fixed to each other before being inserted into guiding holes. More specifically, at the tip of the first optical fiber tape, a small part of a plurality of first optical fibers are exposed from a first covering material. Similarly, at the tip of the second optical fiber tape, a small part of a plurality of second optical fibers are exposed from a second covering material. Then, the first optical fiber tape is overlaid on the second optical fiber tape so as to perform the positional alignment between the first optical fibers and the second optical fibers. An outer rim of the covering material of the optical fiber tapes and centers of the optical fibers are aligned with certain accuracy. Therefore, it is possible to align the optical fibers by overlaying the second covering material on the first covering material and then vertically or horizontally pressing the overlapped first and second covering materials. Thereafter, the first optical fiber tape and the second optical fiber tape are fixed. In this way, the first and second optical fibers are inserted into guiding holes at a time.

Hereinafter, the present invention will be described in detail by way of illustrative examples.

EXAMPLE 1

Figure 1:
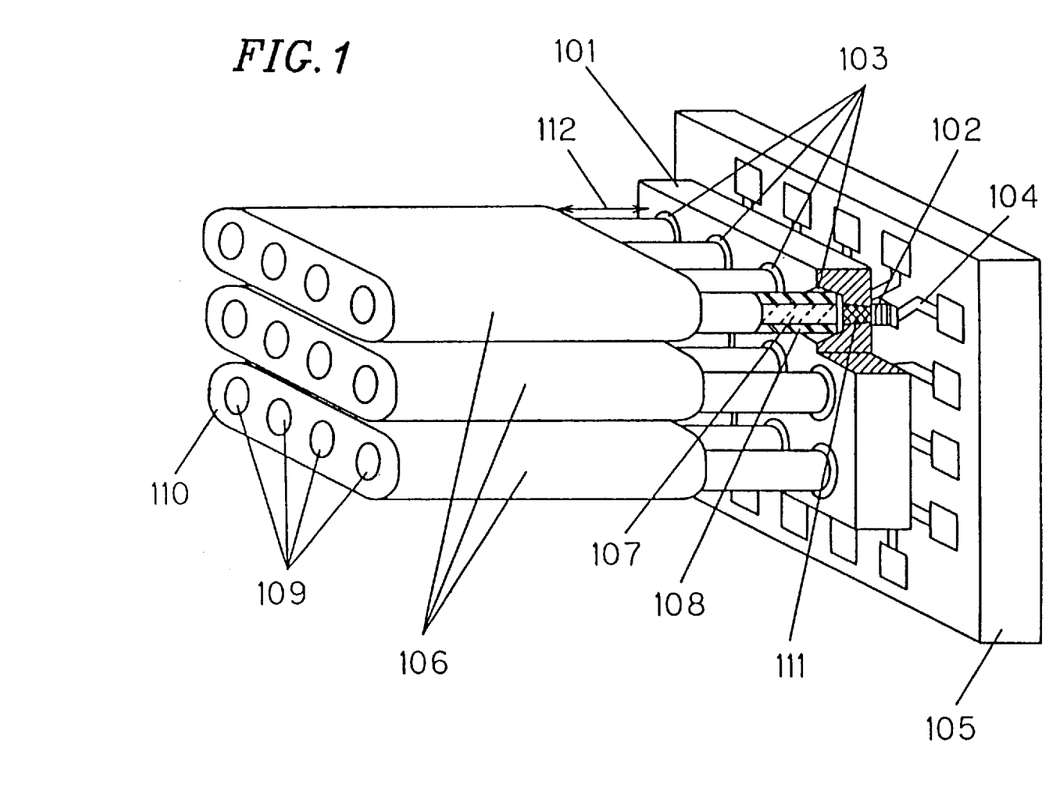
FIG. 1 is a cross-sectional perspective view showing a main portion of a semiconductor laser module according to Example 1 of the present invention.

FIG. 1 is a cross-sectional perspective view showing a main part of a semiconductor laser module according to a first example of the present invention.

A plurality of surface emitting lasers 102 are formed on a primary plane of a semiconductor substrate 101. A plurality of guiding holes 103 are formed on a secondary plane (i.e., a plane opposite to the primary plane) of the semiconductor substrate 101. Although only one surface emitting laser 102 is shown in FIG. 1, the surface emitting lasers 102 are formed in actuality at respective positions corresponding to the guiding holes 103 in a two-dimensional array.

The semiconductor substrate 101 is fixed onto a supporting substrate 105 having a wiring pattern 104 so that the primary plane of the semiconductor substrate 101 is in contact with the supporting substrate 105. As a result, the surface emitting lasers 102 are electrically connected to the wiring pattern 104. Although not shown in FIG. 1, the semiconductor substrate 101 is fixed onto the supporting substrate 105 through adhesion using a UV cured resin or a thermosetting resin.

On the other hand, tips of optical fiber tapes 106 are adjoined to a secondary plane of the semiconductor substrate 101. Each of the optical fiber tapes 106 includes a plurality of optical fibers 109, each including a core 107 and a clad 108, fixed in parallel by a covering material 110.

A plurality of surface emitting lasers 102 are arranged at the pitches each being equal to a central distance between the optical fibers 109. A center of a light beam 111 emitted from each of the surface emitting lasers 102 and a center of each of the guiding holes 103 are aligned with each other so as to be at approximately the same position on the secondary plane of the semiconductor substrate 101. A diameter of the guiding hole 103 is approximately equal to an outer diameter of the optical fiber 109.

At the tip of each optical fiber tape 106, a small part of each of the optical fibers 109 is exposed from the covering material 110. The exposed part of each of the optical fibers 109 is inserted into each of the guiding holes 103.

Using the above configuration, the light beams 111 emitted from the surface light emitting lasers 102 are optically coupled to the respective optical fibers 109. In the case where multimode fibers are used as the optical fibers 109, the guiding holes 103 are aligned with the optical fibers 109 so that a distance between a center of the light beam 111 and a center of the guiding hole 103 is about 10 μm or less on the secondary plane of the semiconductor substrate 101. When a diameter of the guiding hole 103 is larger than an outer diameter of the optical fiber 109 by about 1 μm to about 10 μm, a high optical coupling efficiency of about 60% or higher can be realized.

Moreover, at the tip of the optical fiber tape 106 adjoined to the semiconductor substrate 101, it is desirable that a length 112 of part of the optical fiber 109 which is exposed from the covering material 110 (hereinafter, referred to as an exposed length 112) is about 3 mm or less. This is because if the exposed length of the optical fiber 109 exceeds about 3 mm, the intervals between the optical fibers 109 cannot be maintained.

EXAMPLE 2

Figure 2:
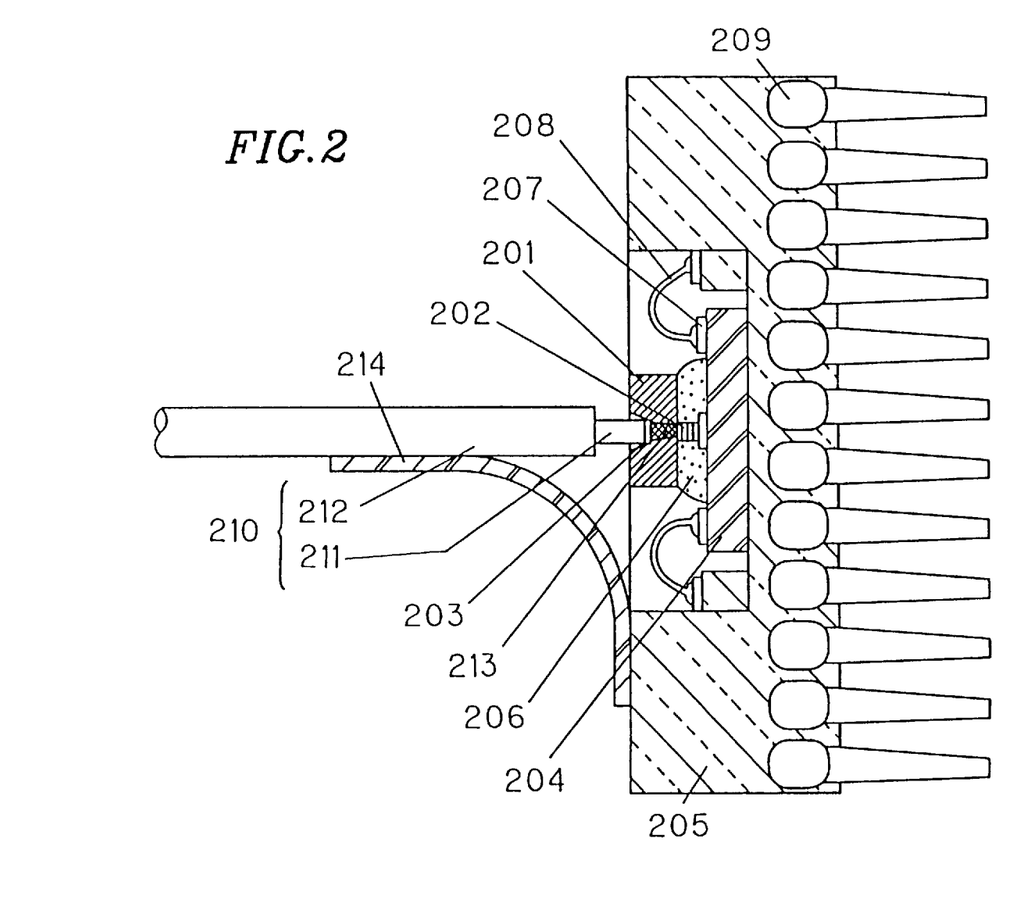
FIG. 2 is a cross-sectional view showing a semiconductor laser module according to Example 2 of the present invention.

FIG. 2 is a cross-sectional view showing a semiconductor laser module according to Example 2 of the present invention.

A surface emitting laser 202 is formed on a primary surface of a semiconductor substrate 201. A guiding hole 203 is formed on a secondary plane of the semiconductor substrate 201. Although only one surface emitting laser 202 and one guiding hole 203 are shown in FIG. 2, a plurality of surface emitting lasers 202 and guiding holes 203 are respectively arranged in one-dimensional arrays in a direction perpendicular to the plane of paper.

The semiconductor substrate 201 is fixed onto a supporting substrate 204 so that the supporting substrate 204 is in contact with the primary plane of the semiconductor substrate 201. The supporting substrate 204 is die-bonded to a package 205. The semiconductor substrate 201 is fixed onto the supporting substrate 204 through adhesion using a UV cured resin or a thermosetting resin 206. The surface emitting laser 202 is electrically connected to a wiring pattern on the supporting substrate 204. As a result, the surface emitting laser 202 is connected to leads 209 of the package 205 from bonding pads 207 of the supporting substrate 204 via wires 208.

On the other hand, a tip of an optical fiber tape 210 is adjoined to a secondary plane of the semiconductor substrate 201. The optical fiber tape 210 includes a plurality of the optical fibers 211 arranged in a direction perpendicular to the plane of paper, which are fixed through a covering material 212.

Pitches between the arranged surface emitting lasers 202 is equal to a center distance between the optical fibers 211. A center of a light beam 213 emitted from each surface emitting laser 202 and a center of the guiding hole 203 are aligned with each other so as to be at approximately the same position on the secondary plane of the semiconductor substrate 201. A diameter of the guiding hole 203 is approximately equal to an outer diameter of the optical fiber 211.

At the tip of the optical fiber tape 210, a small part of the optical fiber 211 is exposed from the covering material 212. The exposed part of the optical fiber 2211 is inserted into the guiding hole 203.

The semiconductor laser module according to Example 2 has basically a configuration such that the supporting substrate 204 according to Example 1 is accommodated in the package 205. Example 2 is distinguished by the following feature. A fiber supporting member 214, which is held perpendicular to the semiconductor substrate 201, is fixed to the package 205, and the covering material 212 of the optical fiber tape 210 is fixed to the fiber supporting member 214. The fiber supporting member 214 serves to enhance the strength of mechanical fixation between the semiconductor substrate 201 and the optical fiber tape 210 in coupling the optical fiber tape 210 using the guiding hole 203.

It is difficult to hold the optical fiber tape 210 and the semiconductor substrate 201 so as to be perpendicular to each other solely by fixing the tip of the optical fiber tape 210 inserted into the guiding hole 203 with a resin or the like. For example, in the case where external force is applied to the optical fiber tape 210, the optical fiber tape 210 is inclined, resulting in lowered optical coupling efficiency between the surface emitting laser 202 and the optical fiber tape 210. On the other hand, external force is prevented from being applied to the tip of the optical fiber tape 210 by fixing the covering material 212 on the optical fiber tape 210 to the fiber supporting member 214.

While the tip of the optical fiber tape 210 is aligned using the guiding hole 203, the fiber supporting member 214 is not strictly aligned with the surface emitting laser 202. Therefore, when the fiber supporting member 214 is misplaced, the optical fiber tape 210 is no longer set perpendicularly to the semiconductor substrate 201. However, by fixing the covering material 212 onto the fiber supporting member 214 at the position far from the tip of the optical fiber tape 210, the degree of such inclination of the optical fiber tape 210 can be reduced. As a result, an optical coupling efficiency is scarcely degraded.

EXAMPLE 3

Figure 3:
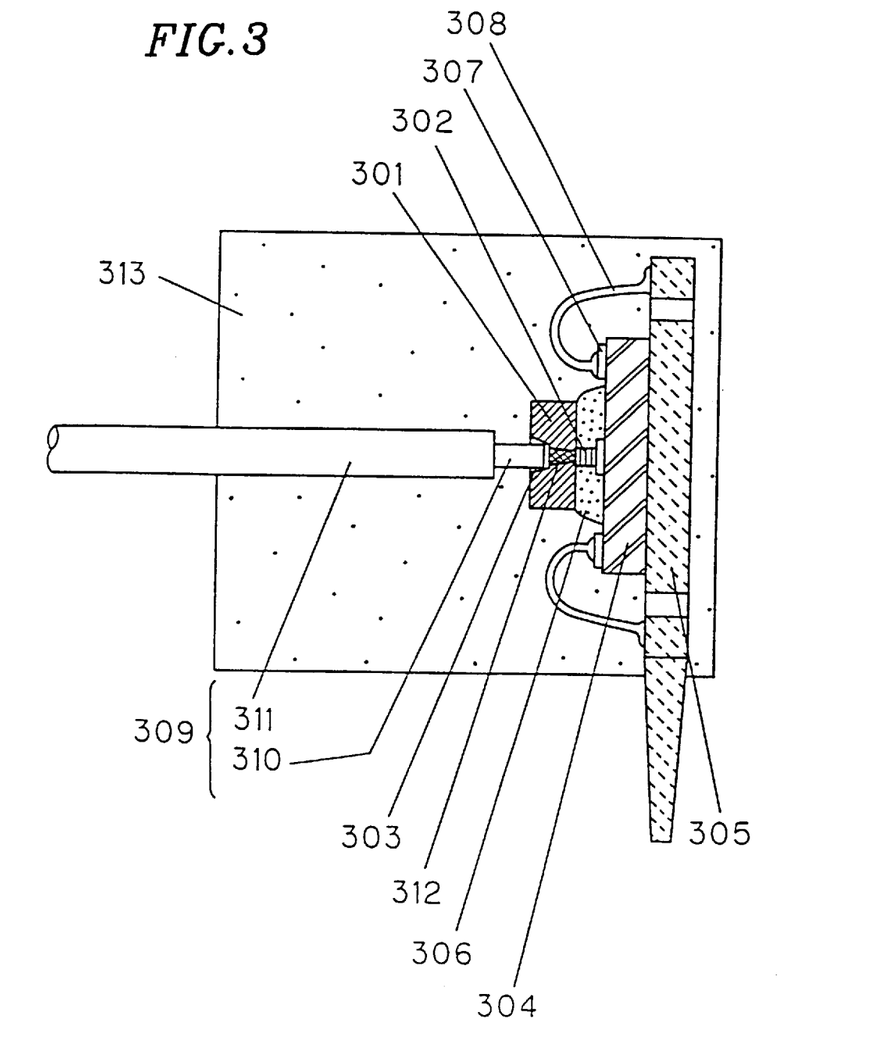

FIG. 3 is a cross-sectional view showing a semiconductor laser module according to Example 3 of the present invention.

A surface emitting laser 302 is formed on a primary plane of a semiconductor substrate 301, and a guiding hole 303 is formed on a secondary plane of the semiconductor substrate 301. The semiconductor substrate 301 is fixed onto a supporting substrate 304 so that the primary plane of the semiconductor substrate 301 is in contact with the supporting substrate 304. The supporting substrate 304 is die-bonded onto a lead frame 305. The semiconductor substrate 301 is fixed onto the supporting substrate 304 through adhesion using a UV cured resin or a thermosetting resin 306. The surface emitting laser 302 is electrically connected to a wiring pattern on the supporting substrate 304. As a result, the surface light emitting laser 302 is connected to the lead frame 305 from bonding pads 307 of the supporting substrate 304 via wires 308.

On the other hand, a tip of an optical fiber cable 309 is adjoined to the secondary plane of the semiconductor substrate 301. The optical fiber cable 309 includes an optical fiber 310 covered with a covering material 311.

A center of a light beam 312 emitted from the surface emitting laser 302 and a center of the guiding hole 303 are aligned with each other so as to be at approximately the same position on the secondary plane of the semiconductor substrate 301. A diameter of the guiding hole 303 is almost equal to an outer diameter of the optical fiber 310.

At the tip of the optical fiber cable 309, a small part of the optical fiber 310 is exposed from the covering material 311 so as to be inserted into the guiding hole 303. A portion of the optical fiber cable 309 vicinal to the tip thereof, the semiconductor substrate 301, the supporting substrate 304 and the lead frame 305 are integrally sealed with a resin molding 313.

The semiconductor laser module according to Example 3 is characterized in that all components including the vicinity of the tip of the optical fiber cable 309 is sealed with a resin. As a result, in coupling of the optical fiber cable 309 using the guiding hole 303, the strength of mechanical fixation between the semiconductor substrate 301 and the optical fiber cable 309 can be enhanced. This effect of Example 3 is the almost same as that of Example 2. However, the semiconductor laser module according to Example 3 is further advantageous since the resin seal utilized in Example 3 generally results in low cost as compared with the package used in Example 2.

Since the optical fiber 310 is inserted into the guiding hole 303 at the tip of the optical fiber cable 309, the position of the optical fiber cable 309 is not shifted even when the resin is injected. However, under some resin injection conditions, the optical fiber cable 309 may be deflected to cause the tip of the optical fiber cable 309 to come off the guiding hole 303. In order to avoid this problem, it is effective to apply the configuration of Example 2 of the present invention in the configuration of Example 3. More specifically, after the covering material 311 of the optical fiber cable 309 is fixed to the fiber supporting member 304 integrally formed with the lead frame 305, the above components including the supporting member 304 are sealed with a resin.

EXAMPLE 4

FIGS. 4A to 4D show the steps of the first half of a method for fabricating a semiconductor laser module according to Example 4 of the present invention.

Figure 4A:
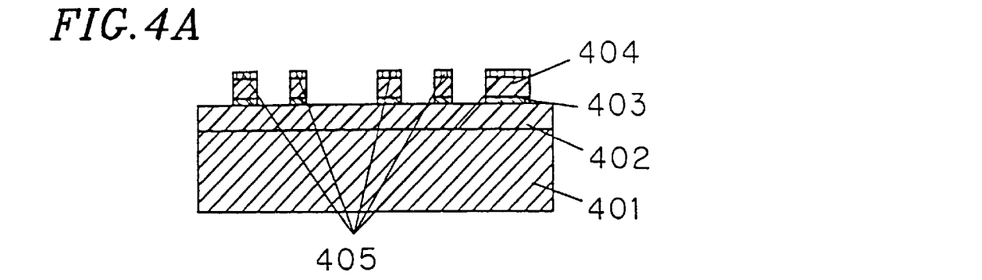
FIGS. 4A to 4D are cross-sectional views showing the steps of the first half of fabricating a semiconductor laser module according to Examples 4 and 5 of the present invention.

First, as shown in FIG. 4A, a first reflector 402 is epitaxially grown on a primary plane of a semiconductor substrate 401 made of GaAs or the like. The first reflector 402 has a multi-layered structure in which a layer made of a semiconductor material such as p-type AlAs and a layer made of another semiconductor material such as p-type GaAs are alternately deposited.

On the first reflector 402, an active layer 403 including, for example, an InGaAs quantum-well layer and a GaAs barrier layer, is epitaxially grown. On the active layer 403, a second reflector 404 is epitaxially grown. The second reflector 404 has a multi-layered structure in which a layer made of a semiconductor material such as n-type AlAs and a layer made of another semiconductor material such as n-type GaAs are alternately deposited.

Figure 4B:
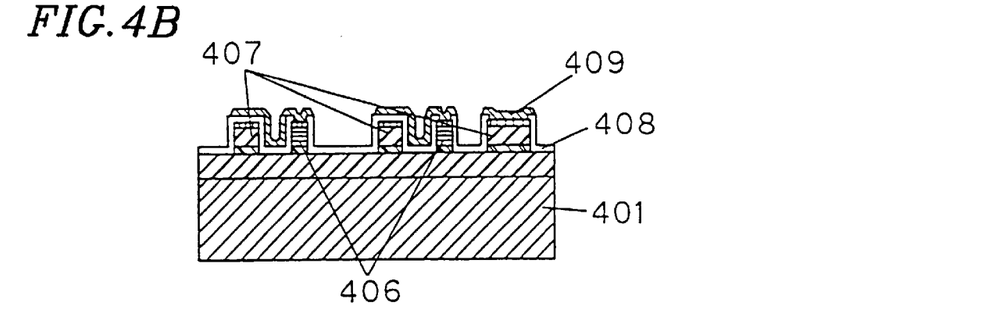

Next, patterned metal electrodes 405 are deposited onto the second reflector 404. Then, the second reflector 404 and the active layer 403 are etched so as to form mesa-shaped portions by using the metal electrodes 405 as masks. The thus formed mesa-shaped portions serve as surface emitting lasers 406 and bumps 407 as shown in FIG. 4B. The bumps 407 act as electrical interconnections during die-bonding. The surface emitting lasers 406 and the bumps 407 are connected to each other through metal wirings 409 respectively deposited onto first insulating films 408.

Thus, the surface emitting lasers 406 arranged in a two-dimensional array are formed on the primary plane of the semiconductor substrate 401.

Figure 4C:
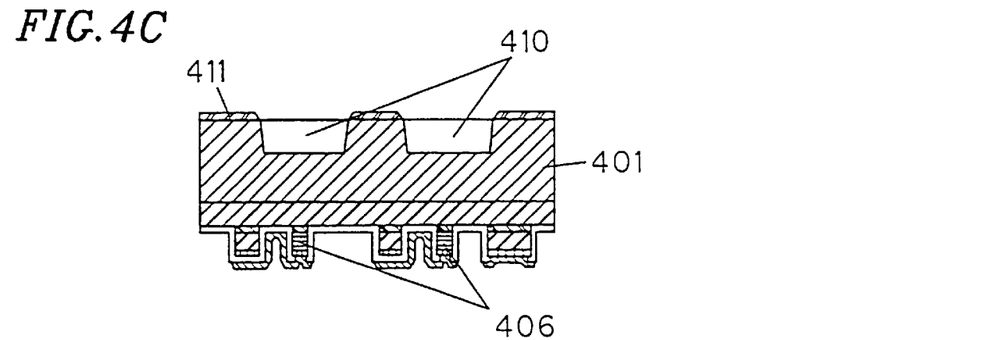

In the step shown in FIG. 4C, guiding holes 410 arranged in a two-dimensional array are formed on a secondary plane of the semiconductor substrate 401 in such a manner that the guiding holes 410 are respectively aligned with the surface emitting lasers 406. In order to perform alignment, a double-sided mask aligner is employed, by which a photomask placed on the surface of a wafer and a bottom face of the wafer are simultaneously observed. Subsequently, a mask pattern is printed onto a surface of the mask, thereby easily achieving the alignment of the guiding holes 410. A second insulating film 411 is etched through the pattern of guiding holes 410 printed onto a photoresist. Then, the semiconductor substrate 401 is etched using the etched second insulating film 411 as a mask, thereby forming the guiding holes 410.

Figure 4D:
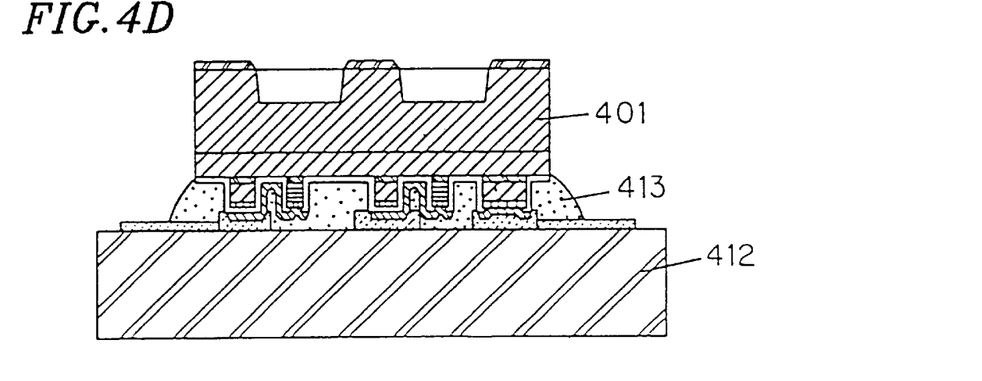

Thereafter, as shown in FIG. 4D, the semiconductor substrate 401 is fixed onto a supporting substrate 412 by, for example, a UV cured resin 413 so that the primary plane of the semiconductor substrate 401 is in contact with the supporting substrate 412.

Figure 5A:
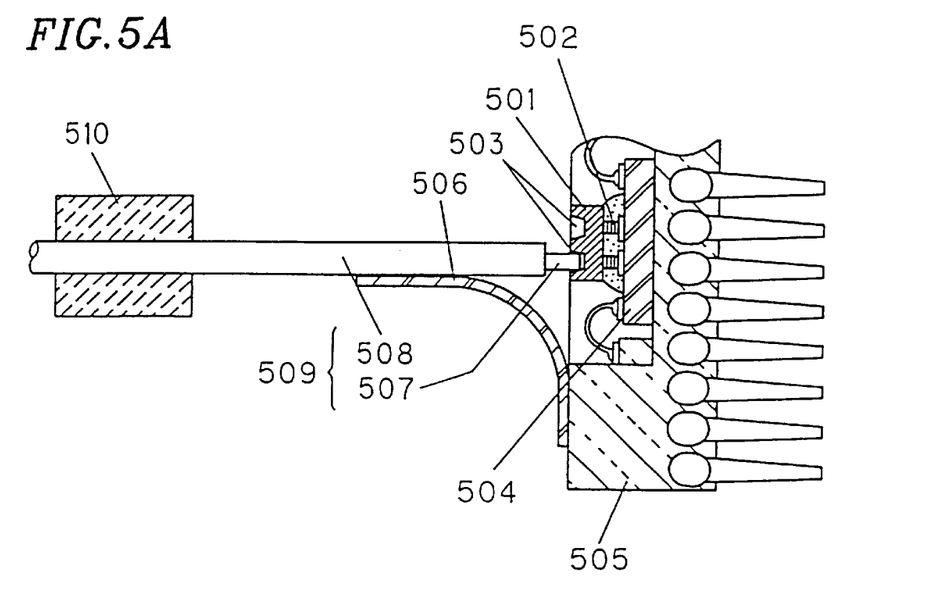
FIGS. 5A and 5B are cross-sectional views showing the latter steps of fabricating the semiconductor laser module according to Example 4 of the present invention.
Figure 5B:
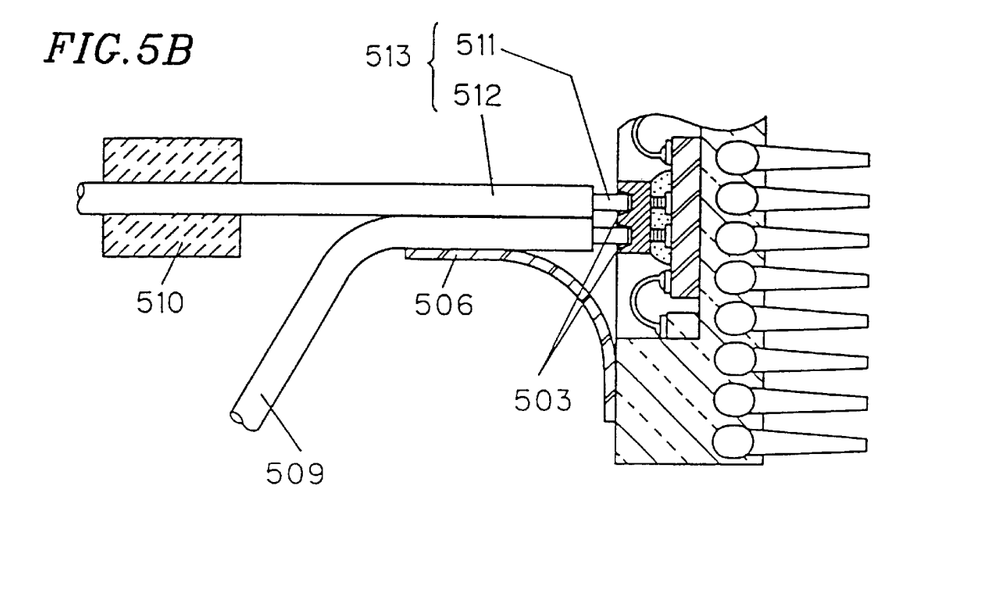

FIGS. 5A and 5B show the latter steps of the method for fabricating the semiconductor laser module according to Example 4 of the present invention.

As shown in FIG. 5A, surface emitting lasers 502 are formed on a primary plane of a semiconductor substrate 501, and guiding holes 503 are formed on a secondary plane of the semiconductor substrate 501. The semiconductor substrate 501 is fixed onto a supporting substrate 504 so that the primary plane of the semiconductor substrate 501 is in contact with the supporting substrate 504. The above components are formed in the previous steps described with reference to FIGS. 4A through 4D.

The supporting substrate 504 is bonded to a package 505, and then a fiber supporting member 506 is attached to the package 505.

Thereafter, at the tip of a first optical fiber tape 509 including a plurality of first optical fibers 507, which are arranged in parallel in a direction perpendicular to the plane of paper and covered with a covering material 508, a small part of the first optical fibers 507 is exposed from the first covering material 508. Then, the exposed parts of the first optical fibers 507 are inserted into guiding holes 503 in a first row, respectively. During this process, the first covering material 508 is clipped with a holding tool 510 attached to an optical stage (not shown) so as to linearly hold the first optical fiber tape 509, thereby aligning the first optical fibers 507 with the respective guiding holes 503 in the first row. The first covering material 508 is then fixed to the fiber supporting member 506 while the first optical fibers 507 are inserted into the respective guiding holes 503. After the first covering material 508 is fixed to the fiber supporting member 506, the holding tool 510 is detached. Then, the first optical fiber tape 509 is curved as shown in FIG. 5B.

In FIG. 5B, at the tip of a second optical fiber tape 513 including a plurality of second optical fibers 511, which are arranged in parallel in a direction perpendicular to the plane of paper and covered with a second covering material 512, a small part of the second optical fibers 511 is exposed from the second covering material 512. Then, the exposed parts of the second optical fibers 511 are inserted into guiding holes 503 in a second row, respectively. As in the case of insertion of the first optical fibers 507, the second covering material 512 is clipped with the holding tool 510 attached to the optical stage described above. In this case, the first optical fiber tape 509 does not interfere with the alignment of the second optical fiber tape 513 because the first optical fiber tape 509 is curved.

Finally, the second covering material 512 is fixed to the first covering material 508, -thereby completing the fixation of the first and second optical fiber tapes 509 and 513.

EXAMPLE 5

Figure 6A:
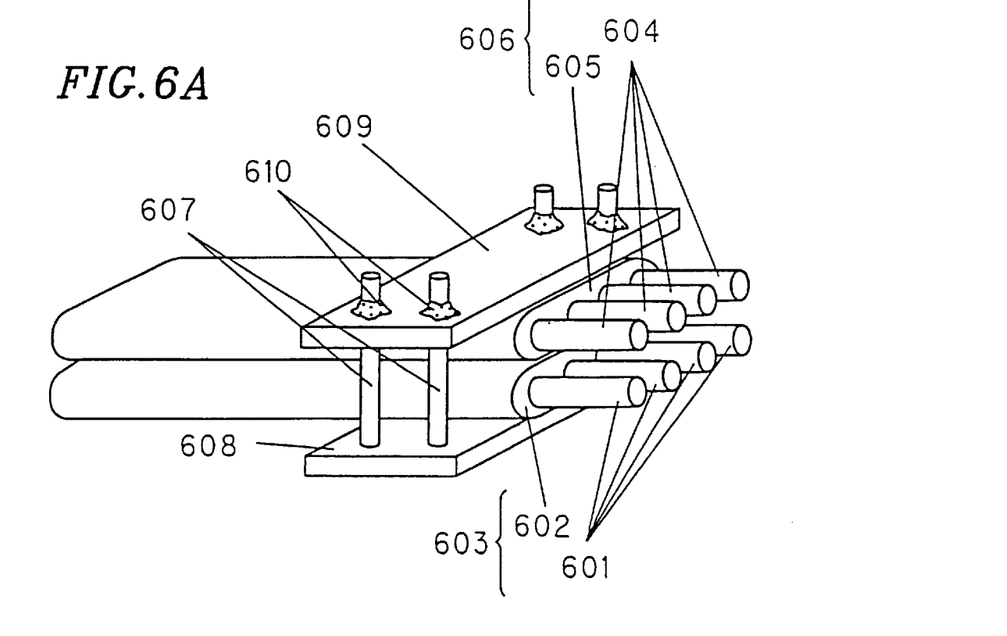
FIGS. 6A and 6B are perspective and crosssectional views showing the latter steps of fabricating the semiconductor laser module according to Example 5 of the present invention.
Figure 6B:
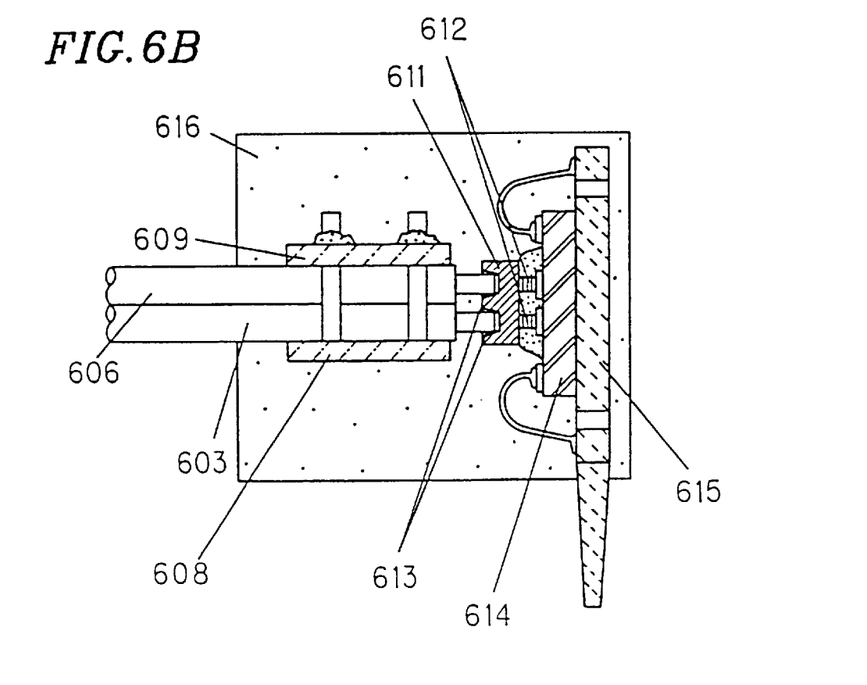

FIGS. 6A and 6B are perspective and cross-sectional views showing the latter steps of another method for fabricating a semiconductor laser module according to Example 5 of the present invention. The first half steps of Example 5 are the same as those of Example 4, and therefore detailed explanation thereof is omitted here.

In FIG. 6A, at the tip of a first optical fiber tape 603 including a plurality of first optical fibers 601 fixed in parallel by a first covering material 602, a small part of the first optical fibers 601 is exposed from the first covering material 602. Similarly, at the tip of a second optical fiber tape 606 including a plurality of second optical fibers 604 fixed in parallel by a second covering material 605, a small part of the second optical fibers 604 is exposed from the second covering material 605.

Next, the first optical fibers 601 and the second optical fibers 604 are positionally aligned with each other so as to overlay the second optical fiber tape 606 on the first optical fiber tape 603. This positional alignment can be realized by, for example, placing the first and second optical fiber tapes 603 and 606 on a fiber table 608 having guiding pins 607. A fiber presser 609 is placed on the thus placed first and second optical fiber tapes 603 and 606. The guiding pins 607 and the fiber presser 609 are fixed through an adhesive 610, thereby fixing the first optical fiber tape 603 and the second optical fiber tape 606.

In FIG. 6B, surface emitting lasers 612 are formed on a primary plane of a semiconductor substrate 611, and guiding holes 613 are formed on a secondary plane of the semiconductor substrate 611. The semiconductor substrate 611 is fixed onto a supporting substrate 614 so that the primary plane of the semiconductor substrate 611 is in contact with the supporting substrate 614. The above components are fabricated in the former steps shown in FIGS. 4A through 4D.

The supporting substrate 614 is bonded onto a lead frame 615. The first and second optical fiber tapes 603 and 606, which are fixed to each other at the regions vicinal to their tips, are adjoined to a secondary plane of the semiconductor substrate 611. Since the first optical fibers 601 and the second optical fibers 604 are aligned with each other, the first optical fibers 601 and the second optical fibers 604 can be inserted into the respective guiding holes 613 at a time.

Finally, portions of the first and second optical fiber tapes 603 and 606 vicinal to the tips thereof, the semiconductor substrate 611, the supporting substrate 614 and the lead frame 615 are integrally sealed with a resin molding 616.

Although the typical structures and fabrication methods are shown in the above description of the examples, it is apparent that an appropriate combination thereof can be also employed.

According to the semiconductor laser module of the present invention, a plurality of optical fibers can be optically coupled to a plurality of surface emitting lasers formed on a semiconductor substrate based on mechanical positional alignment.

According to the configuration of the present invention, the optical fibers are aligned with guiding holes which are formed on a secondary plane of the semiconductor substrate so as to be aligned with the respective surface emitting lasers. Therefore, the number of components, the fabrication steps and the working time for assembly can be reduced as compared not only with an alignment method for fixing optical fibers while operating a semiconductor laser to emit light at a point where output optical power from the far end of the optical fibers is at maximum but also with a mechanical alignment method using a substrate having a V-shaped groove. As a result, it is possible to fabricate a semiconductor module at low cost.

Furthermore, the conventional methods involve the following problems: upon insertion of optical fibers into guiding holes, a previously inserted optical fiber interferes with the alignment of a next optical fiber; and when a length of the exposed part of optical fibers of an optical fiber tape is long, the intervals between the optical fibers cannot be maintained. The present invention solves these problems.

Additionally, the mechanical fixation between the semiconductor substrate and the optical fibers is sufficiently assured. Therefore, the optical fibers are not inclined or the fixed part does not come off even if external force is applied to the optical fibers.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A semiconductor laser module, comprising:

a semiconductor substrate;

a plurality of surface emitting lasers formed on a primary plane of the semiconductor substrate;

a plurality of guiding holes formed on a secondary plane of the semiconductor substrate, the secondary plane being opposite to the primary plane; and an optical fiber tape including a plurality of optical fibers and a covering material which fixes the plurality of optical fibers in parallel with each other, one tip of the optical fiber tape being adjoined to the secondary plane of the semiconductor substrate, wherein a pitch of the respective surface emitting lasers is equal to an interval of a center of the respective optical fibers, the respective surface emitting lasers comprise a layered structure for emitting light which is grown on the semiconductor substrate, the respective guiding holes are aligned with the respective surface emitting lasers so that a center of a light beam emitted from each of the surface emitting lasers and a center of each of the guiding holes are at approximately the same position on the secondary plane of the semiconductor substrate, a diameter of each of the guiding holes is substantially equal to an outer diameter of each of the optical fibers, and a portion of the respective optical fibers at tips thereof is exposed from the covering material and inserted into the respective guiding holes.

2. A semiconductor laser module according to claim 1, wherein the plurality of surface emitting lasers and the plurality of guiding holes are arranged in a two-dimensional array, and the plurality of optical fibers included in the optical fiber tape are arranged in a one-dimensional array, and a plurality of the optical fiber tapes are overlaid on each other and adjoined to the secondary plane of the semiconductor substrate.

3. A semiconductor laser module according to claim 1, further comprising a supporting substrate having a wiring pattern provided thereon, wherein the semiconductor substrate is fixed on the supporting substrate in such a manner that the primary plane of the semiconductor substrate is in contact with the supporting substrate, so that the surface emitting lasers are electrically connected to the wiring pattern.

4. A semiconductor laser module according to claim 3, wherein the semiconductor substrate is fixed to the supporting substrate using a resin.

5. A semiconductor laser module according to claim 1, wherein the guiding holes are aligned with the surface emitting lasers so that a distance between the center of the light beam emitted from each of the surface emitting lasers and the center of each of the guiding holes is set to be about 10 μm or less on the secondary plane of the semiconductor substrate.

6. A semiconductor laser module according to claim 1, wherein the respective guiding holes are aligned with the respective surface emitting lasers using a mask aligner which exposes a pattern on the secondary plane which is aligned to a pattern on the primary plane.

7. A semiconductor laser module, comprising:
a semiconductor substrate;
a plurality of surface emitting lasers formed on a primary plane of the semiconductor substrate;
a plurality of guiding holes formed on a secondary plane of the semiconductor substrate, the secondary plane being opposite to the primary plane; and
an optical fiber tape including a plurality of optical fibers and a covering material which fixes the plurality of optical fibers in parallel with each other, one tip of the optical fiber tape being adjoined to the secondary plane of the semiconductor substrate,
wherein a pitch of the respective surface emitting lasers is equal to an interval of a center of the respective optical fibers,
the respective guiding holes are aligned with the respective surface emitting lasers so that a center of a light beam emitted from each of the surface emitting lasers and a center of each of the guiding holes are at approximately the same position on the secondary plane of the semiconductor substrate,
a diameter of each of the guiding holes is larger than an outer diameter of each of the optical fibers by about 1 μm to about 10 μm, and
a portion of the respective optical fibers at tips thereof is exposed from the covering material and inserted into the respective guiding holes.

8. A semiconductor laser module, comprising:
a semiconductor substrate;
a plurality of surface emitting lasers formed on a primary plane of the semiconductor substrate;
a plurality of guiding holes formed on a secondary plane of the semiconductor substrate, the secondary plane being opposite to the primary plane; and
an optical fiber tape including a plurality of optical fibers and a covering material which fixes the plurality of optical fibers in parallel with each other, one tip of the optical fiber tape being adjoined to the secondary plane of the semiconductor substrate,
wherein a pitch of the respective surface emitting lasers is equal to an interval of a center of the respective optical fibers,
the respective guiding holes are aligned with the respective surface emitting lasers so that a center of a light beam emitted from each of the surface emitting lasers and a center of each of the guiding holes are at approximately the same position on the secondary plane of the semiconductor substrate,
a portion of the respective optical fibers at tips thereof is exposed from the covering material and inserted into the respective guiding holes, and
a length of the portion of the respective optical fibers at the adjoined tip thereof exposed from the covering material is about 3 mm or less.

9. A semiconductor laser module, comprising:
a supporting substrate;
a semiconductor substrate, having a primary plane and a secondary plane opposite to the primary plane, provided on the supporting substrate in such a manner that the primary plane is in contact with the supporting substrate;
a surface emitting laser formed on the primary plane of the semiconductor substrate;
a guiding hole formed on the secondary plane of the semiconductor substrate;
an optical fiber cable including an optical fiber and a covering material which covers the optical fiber, one tip of the optical fiber cable being adjoined to the secondary plane of the semiconductor substrate; and
a fiber supporting member provided perpendicularly to the semiconductor substrate,
wherein the guiding hole is aligned with the surface emitting laser so that a center of a light beam emitted from the surface emitting laser and a center of the guiding hole are at approximately the same position on the secondary plane of the semiconductor substrate,
the respective surface emitting lasers comprise a layered structure for emitting light which is grown on the semiconductor substrate,
a diameter of the guiding hole is substantially equal to an outer diameter of the optical fiber,
a portion of the optical fiber at one tip thereof is exposed from the covering material and inserted into the guiding hole, and
the covering material is supported by the fiber supporting member.

10. A semiconductor laser module according to claim 9, wherein a plurality of the surface emitting lasers and a plurality of the guiding holes are provided, the optical fiber cable is an optical fiber tape which includes a plurality of the optical fibers fixed in parallel with each other by the covering material, and a pitch of the respective surface emitting lasers is equal to an interval of a center of the respective optical fibers.

11. A semiconductor laser module according to claim 10, wherein the plurality of surface emitting lasers and the plurality of guiding holes are arranged in a two-dimensional array, and the plurality of optical fibers included in the optical fiber tape are arranged in a one-dimensional array, and the plurality of optical fiber tapes are adjoined to the secondary plane of the semiconductor substrate.

12. A semiconductor laser module according to claim 9, wherein the guiding hole is aligned with the surface emitting laser using a mask aligner which exposes a pattern on the secondary plane which is aligned with a pattern on the primary plane.

13. A semiconductor laser module, comprising:
a supporting substrate;
a semiconductor substrate, having a primary plane and a secondary plane opposite to the primary plane, provided on the supporting substrate in such a manner that the primary plane is in contact with the supporting substrate;
a surface emitting laser formed on the primary plane of the semiconductor substrate;
a guiding hole formed on the secondary plane of the semiconductor substrate;

an optical fiber cable including an optical fiber and a covering material which covers the optical fiber, one tip of the optical fiber cable being adjoined to the secondary plane of the semiconductor substrate; and a resin molding which integrally seals the semiconductor substrate, the supporting substrate, and a portion of the optical fiber located in the vicinity of the adjoined tip thereof, wherein the guiding hole is aligned with the surface emitting laser so that a center of a light beam emitted from the surface emitting laser and a center of the guiding hole are at approximately the same position on the secondary plane of the semiconductor substrate, the respective surface emitting lasers comprise a layered structure for emitting light which is grown on the semiconductor substrate, a diameter of the guiding hole is substantially equal to an outer diameter of the optical fiber, and a portion of the optical fiber at one tip thereof is exposed from the covering material and inserted into the guiding hole.

14. A semiconductor laser module according to claim 13, wherein a plurality of the surface emitting lasers and a plurality of the guiding holes are provided, the optical fiber cable is an optical fiber tape which includes a plurality of the optical fibers fixed in parallel with each other by the covering material, and a pitch of the respective surface emitting lasers is equal to an interval of a center of the respective optical fiber core wires.

15. A semiconductor laser module according to claim 14, wherein the plurality of surface emitting lasers and the plurality of guiding holes are arranged in a two-dimensional array, and the plurality of optical fibers included in the optical fiber tape are arranged in a one-dimensional array, and the plurality of optical fiber tapes are adjoined to the secondary plane of the semiconductor substrate.

16. A semiconductor laser module according to claim 13, further comprising a fiber supporting member, wherein the covering material is supported by the fiber supporting member.

17. A semiconductor laser module according to claim 13, wherein the guiding hole is aligned with the surface emitting laser using a mask aligner which exposes a pattern on the secondary plane which is aligned with a pattern on the primary plane.

18. A method for fabricating a semiconductor laser module, comprising the steps of:

forming a plurality of surface emitting lasers which are arranged in a two-dimensional array on a primary plane of a semiconductor substrate;

forming a plurality of guiding holes arranged in a two-dimensional array on a secondary plane of the semiconductor substrate in such a manner that the respective guiding holes are aligned with the respective surface emitting lasers;

fixing the semiconductor substrate on a supporting substrate in such a manner that the primary plane of the semiconductor substrate is in contact with the supporting substrate;

providing a first optical fiber tape including a plurality of first optical fibers and a first covering material which fixes the first optical fibers in parallel with each other, and exposing a portion of the first optical fibers at tips thereof from the first covering material;

aligning the respective first optical fibers with the respective guiding holes in a first row so that the respective first optical fibers are inserted into the respective guiding holes in the first row, thereby adjoining the first optical fiber tape to the secondary plane of the semiconductor substrate;

fixing the first covering material of the first optical fiber tape to a fiber supporting member;

providing a second optical fiber tape including a plurality of second optical fibers and a second covering material which fixes the second optical fibers in parallel with each other, and exposing a portion of the second optical fibers at tips thereof from the second covering material;

aligning the respective second optical fibers with the respective guiding holes in a second row so that the respective second optical fibers are inserted into the respective guiding holes in the second row, thereby adjoining the second optical fiber tape to the secondary plane of the semiconductor substrate; and fixing the second covering material of the second optical fiber tape to the first covering material of the first optical fiber tape.

19. A method according to claim 18, wherein a double-sided mask aligner is employed for aligning the respective surface emitting lasers with the respective guiding holes.

20. A method according to claim 18, wherein the semiconductor substrate is fixed to the supporting substrate using a resin.

21. A method for fabricating a semiconductor laser module according to claim 18, wherein the respective guiding holes are aligned with the respective surface emitting lasers using a mask aligner which exposes a pattern on the secondary plane which is aligned with a pattern on the primary plane.

22. A method for fabricating a semiconductor laser module according to claim 18, wherein the step of forming a plurality of surface emitting lasers includes the step of growing a layered structure for emitting light on the semiconductor substrate.

23. A method for fabricating a semiconductor laser module according to claim 18, wherein the first optical fiber tape is kept in a curved state at least during the step of aligning the respective second optical fibers.

24. A method for fabricating a semiconductor laser module, comprising the steps of:

providing a plurality of surface emitting lasers which are arranged in a two-dimensional array on a primary plane of a semiconductor substrate;

forming a plurality of guiding holes arranged in a two dimensional array on a secondary plane of the semiconductor substrate in such a manner that the respective guiding holes are aligned with the respective surface emitting lasers;

fixing the semiconductor substrate on a supporting substrate in such a manner that the primary plane of the semiconductor substrate is in contact with the supporting substrate;

providing a first optical fiber tape including a plurality of first optical fibers and a first covering material which fixes the first optical fibers in parallel with each other, and exposing a portion of the first optical fibers at tips thereof from the first covering material;

providing a second optical fiber tape including a plurality of second optical fibers and a second covering material which fixes the second optical fibers in parallel with each other, and exposing a portion of the second optical fibers at tips thereof from the second covering material;

overlaying the second optical fiber tape onto the first optical fiber tape, thereby aligning the respective first optical fibers with the respective second optical fibers;

fixing the first and second optical fiber tapes with each other; and aligning the respective first and second optical fibers with the respective guiding holes so that the respective first and second optical fibers are inserted into the respective guiding holes, thereby adjoining the first and second optical fiber tapes to the secondary plane of the semiconductor substrate.

25. A method according to claim 24, wherein a double-sided mask aligner is employed for aligning the respective surface emitting lasers with-the respective guiding holes.

26. A method according to claim 24, further comprising the step of integrally sealing with a resin the semiconductor substrate, the supporting substrate, and a portion of the first and second optical fiber tapes located in the vicinity of the adjoined tips thereof.

* * * * *

UNITED STATES PATENT AND TRADEMARK OFFICE
CERTIFICATE OF CORRECTION

PATENT NO. : 5,774,616
DATED : June 30, 1998
INVENTOR(S) : Matsuda

It is certified that error appears in the above-identified patent and that said Letters Patent is hereby corrected as shown below:

On the Cover Page, Field [73] Assignee, "Matsushita Electrical Industrial Co., Ltd." should read --Matsushita Electric Industrial Co., Ltd.--.

Signed and Sealed this

Twenty-fourth Day of November, 1998

Attest:

BRUCE LEHMAN

Attesting Officer

Commissioner of Patents and Trademarks